Nov. 4, 1969     J. A. CONNELLY     3,476,160
TWIN BAR CHAIN SAW BAR
Filed May 15, 1967
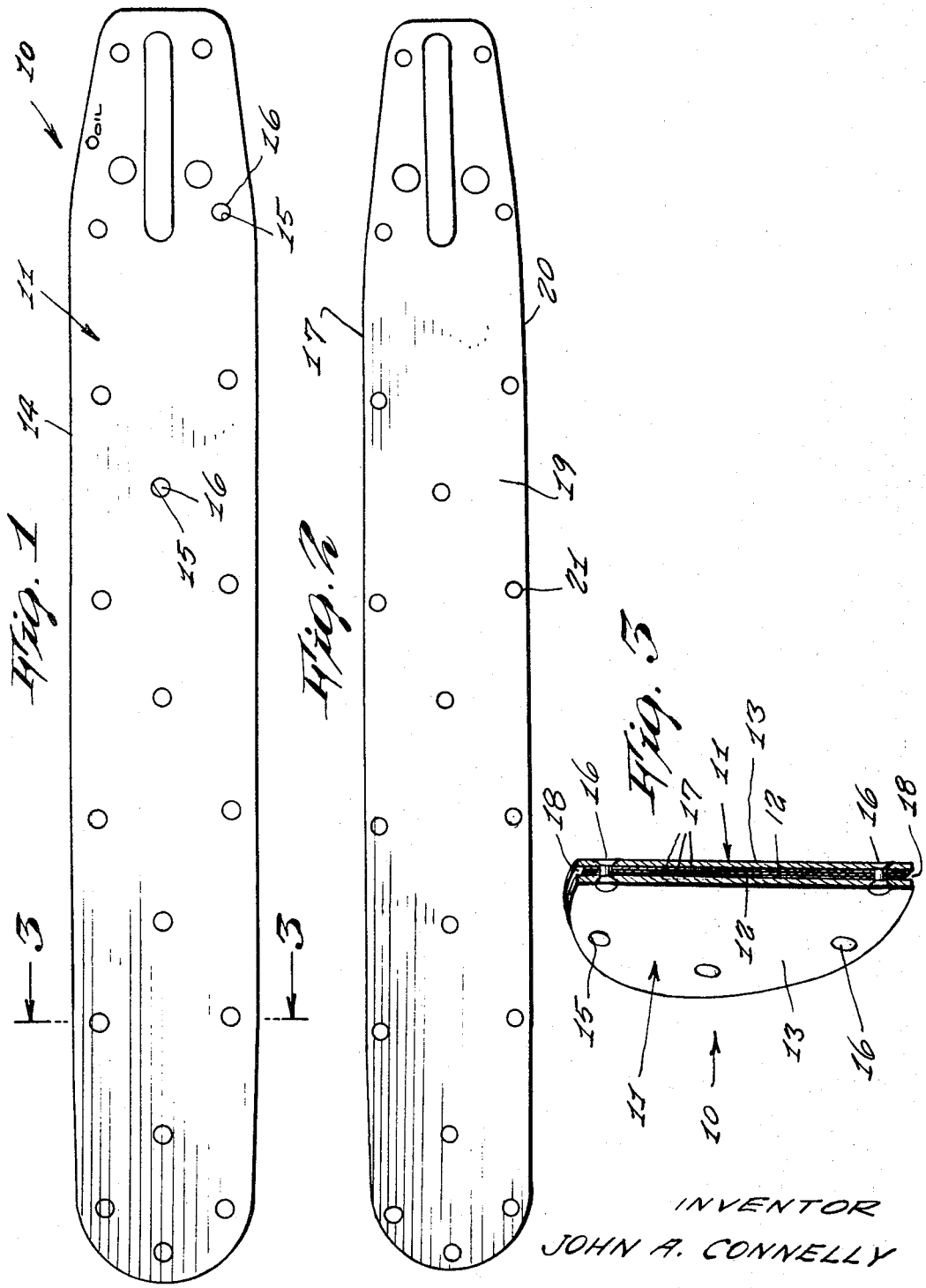
INVENTOR
JOHN A. CONNELLY

United States Patent Office 3,476,160
Patented Nov. 4, 1969

1

3,476,160
TWIN BAR CHAIN SAW BAR
John A. Connelly, New Florence, Mo. 63363
Filed May 15, 1967, Ser. No. 638,207
Int. Cl. B27b *17/02*
U.S. Cl. 143—32        1 Claim

ABSTRACT OF THE DISCLOSURE

A bar assembly, for a chain saw, which is comprised of two bars that are riveted together, the bars being placed in side by side relation and having a proper thickness of shims therebetween to give a correct thickness to the entire assembly so to adjustably control the right clearance for an endless saw chain in a peripheral groove formed between the bars.

---

This invenion relates generally to chain saws. More specifically it relates to chain saw bars. It is generally well known among chain saw owners that a conventional one piece bar wears away within the chain groove. Often two or more new chains have been used, and it is impossible to cut large timer without bending and pinching. This is of course objectionable and in need of improvement.

Accordingly it is a principal object of the present invention to provide a chain saw bar having self contained means to be adjusted after wear of the chain grooves occurs, so to again re-establish the right clearance for the chain in the grooves.

Another object is to provide a chain saw bar assembly that is comprised of a pair of twin bars that are riveted together and which have a proper thickness of shims therebetween so to establish the right clearance for the chain in the grooves.

Yet another object is to provide a twin bar chain saw bar which can be simply adjusted for right clearance for the chain in the grooves by punching out the rivets that hold together the bar assembly to separate the parts, and then reassemble the same again with the proper thickness of shims therebetween.

Other objects are to provide a twin bar chain saw bar which is simple in design, inexpensive to manufacture, rugged in construction, easy to use and efficient in operation.

These and other objects will be readily evident upon a study of the following specification and the accompanying drawing wherein:

FIGURE 1 is a side elevation view of a chain saw bar assembly incorporating the present invention, FIGURE 2 is a side elevation view of a shim that forms a part of the present invention, and FIGURE 3 is a cross sectional view taken on line 3—3 of FIGURE 1, and shown in perspective.

Referring now to the drawing in detail, the reference numeral 10 represents a twin bar chain saw bar assembly according to the present invention wherein there are a pair of twin bars 11. Each of the bars 11 are of elongated configuration and provided with means for carrying an endless chain saw that travels thereon. Each of the bars comprises a generally flat member having parallel flat inner and outer sides 12 and 13 respectively bounded by a peripheral edge 14. A plurality of rivet openings 15 are provided through each of the bars for purpose of receiving rivets 16 that lock the assembly 10 together. As is most clearly shown in FIGURE 3, the rivets are made with flat heads, and the openings 15 are accordingly countersunk upon their outer side.

A plurality of shims 17 comprise a remainder of the assembly, the shims being placed between the inner sides of the twin bars. Each of the shims comprises a relatively thin flat member having the generally same contour as the twin bars, but wherein the shim is relatively smaller all around so that when assembled, there is a peripheral groove 18 for receiving the saw chain, as shown in FIGURE 3. Each shim accordingly has parallel opposite flat sides 19 bounded by a peripheral edge 20, and having rivet openings 21 therethrough which are aligned with the openings 15 of the bars 11.

In operative use, when the grooves 18 wear in width, the rivets 16 are punched out to separate the parts. A correct amount of shims are removed to restore the original groove width or thickness and the remaining parts are then re-riveted together.

Thus there has been shown an improved and more practical construction for restoring a chain saw bar after the grooves have become worn, which is better in result than the practice of trying to press the bar to squeeze together the groove sides.

While various changes may be made in the detail construction, it is understood that such changes will be within the spirit and scope of the present invention.

Having thus set forth and disclosed the nature of this invention, what is claimed is:

1. In a chain saw bar, the combination of an assembly comprised of a pair of twin bars of like size and contour secured together in side by side relationship relative to each other and having means therebetween to form an adjustable groove around a perimeter thereof for carrying an endless chain, said means comprising a plurality of relatively thin shims, each of said twin bars comprising an elongated member that is flat on at least one side and bounded by a peripheral edge, each of said shims comprising a flat member with a peripheral contour generally the same as said twin bars but wherein said shims are relatively smaller so to form said peripheral groove between said twin bars, said twin bars and shims being provided with a plurality of rivet openings therethrough and in alignment with each other for securement together by flat headed rivets, and said twin bar openings being accordingly countersunk on their outer sides to receive said flat rivet heads.

References Cited

UNITED STATES PATENTS

| | | | |
|---|---|---|---|
| 830,860 | 9/1906 | Smith | 143—32 |
| 1,748,412 | 2/1930 | Crawford | 308—244 X |
| 2,660,204 | 11/1953 | Rosenboom | 143—32 |
| 3,191,646 | 6/1965 | Merz | 143—32 |

DONALD R. SCHRAN, Primary Examiner